United States Patent [19]

Brazle

[11] Patent Number: 5,722,147
[45] Date of Patent: Mar. 3, 1998

[54] APPARATUS FOR PRESS FITTING AN END FITTING ONTO A HOLLOW TUBE

[75] Inventor: Earl Brazle, Whitleyville, Tenn.

[73] Assignee: Dana Corporation, Toledo, Ohio

[21] Appl. No.: 774,394

[22] Filed: Dec. 30, 1996

[51] Int. Cl.$^6$ .............................. B23Q 3/00; B23P 19/02; B25B 27/14
[52] U.S. Cl. .............................. 29/464; 29/525; 29/281.1
[58] Field of Search .............................. 29/283, 281.1, 29/525, 559, 464, 468; 269/49; 294/94, 96

[56] References Cited

U.S. PATENT DOCUMENTS

| | | |
|---|---|---|
| 1,418,766 | 6/1922 | Wilson .............................. 294/96 |
| 2,594,429 | 4/1952 | Handley .............................. 294/96 |
| 3,438,135 | 4/1969 | Bense . |
| 4,729,157 | 3/1988 | McCue . |
| 4,790,079 | 12/1988 | Meyers . |
| 5,033,292 | 7/1991 | Dennis . |
| 5,153,976 | 10/1992 | Fradin et al. .............................. 29/283 |
| 5,513,441 | 5/1996 | Dennis . |

*Primary Examiner*—S. Thomas Hughes
*Assistant Examiner*—Tisa Stewart
*Attorney, Agent, or Firm*—MacMillan, Sobanski & Todd

[57] ABSTRACT

A fixture for press fitting an end yoke onto the end of a vehicle drive shaft tube includes a base having a plurality of tube supports secured thereto for supporting the tube thereon in a predetermined axial orientation. An end fitting is supported on a vertically-oriented, support pin assembly. The support pin assembly includes an upstanding pin having slot formed through the center of the upper end thereof. The slot has a lower edge which extends at an angle relative to the pin. A tab is retained within the slot and guided for sliding movement between a first extended position and a second retracted position. In the extended position, the tab defines a first width for the support pin assembly. In the retracted position, the tab defines a second width for the support pin assembly which is less than the first width. The end yoke is initially supported on the pin by aligning the openings formed through the yoke arms with the pin, then moving the end yoke downwardly such that the pin is received within the aligned yoke arm openings. The openings formed through the yoke arms define an inner diameter which is approximately equal to the first width defined by the support pin assembly when the tab is in the extended position. Thus, the support pin fits snugly within the openings of the yoke arms to insure proper alignment and phasing of the end yoke. At the completion of the press fitting operation, the end yoke is removed from the support pin assembly by raising it upwardly therefrom. When the end yoke is moved upwardly relative to the support pin assembly, the tab will be moved upwardly therewith. As a result, the effective width of the support pin assembly decreases from the first width to the second width, allowing free removal of the end yoke from the fixture.

11 Claims, 4 Drawing Sheets

APPARATUS FOR PRESS FITTING AN END FITTING ONTO A HOLLOW TUBE

BACKGROUND OF THE INVENTION

This invention relates to fixture for press fitting end fittings onto the ends of hollow tubes. In particular, this invention relates to an improved fixture for press fitting an end yoke onto the end of a vehicle drive shaft tube which facilitates removal of the end fitting from the fixture after assembly.

In most land vehicles in use today, a drive train assembly is provided for transmitting rotational power from an output shaft of an engine/transmission assembly to an input shaft of an axle assembly so as to rotatably drive the wheels of the vehicle. A typical drive train assembly includes a drive shaft having a pair of universal joints secured to the ends thereof. The drive shaft includes a hollow cylindrical tube having an end fitting secured to each end thereof. Usually, the end fittings are embodied as end yokes which are adapted to cooperate with the respective universal joints. Each end yoke has a pair of opposed arms or lugs connected to a cylindrical sleeve portion. The sleeve portion is adapted to be press fit onto an end of the hollow cylindrical tube. Each yoke arm has an opening formed therethrough for receiving opposed trunnions of the cross member used in the universal joint. The yoke arm openings are co-axially aligned and the axis defined by the yoke arm openings extends generally perpendicularly to the longitudinal axis of the tube.

In a known fixture for press fitting an end yoke onto an open end of a hollow tube, an upstanding pin is provided. The end yoke is supported on the pin by aligning the openings formed through the yoke arms with the pin, then moving the end yoke downwardly such that the pin is received within the aligned yoke arm openings and the sleeve portion extends horizontally therefrom. The fixture further includes a press machine having support, alignment, and force-generating capabilities for press fitting the end fitting onto the drive shaft tube. The hollow tube is supported horizontally on the machine such that one end thereof is positioned adjacent to the sleeve portion of the end yoke. A fluid-powered ram or other device may be used to move the support pin (and the end yoke supported thereon) toward the tube, thereby causing the sleeve portion of the end yoke to be press fit within the hollow end of the tube. The pin provides a reaction surface to support the end yoke in position during this press-fitting operation.

In order to insure proper alignment and phasing of the end yoke on the drive shaft tube during the press fitting process, the support pin is typically sized to fit snugly within the opening of the yoke arms. In other words, the outer diameter defined by the pin is only slightly smaller than the inner diameter defined by the openings. Although this design is effective in achieving the proper alignment and phasing, it has been found that the end yoke can become slightly misaligned relative to the pin during the press fitting process. When this occurs, the end yoke frictionally engages the pin and, therefore, is difficult to remove therefrom. This situation obviously interferes with the efficient manufacture of the drive shaft. Thus, it would be desirable to provide an improved fixture for press fitting an end yoke onto the end of a vehicle drive shaft tube which maintains the proper alignment and phasing between the end yoke and the tube, and which further facilitates the easy removal of the end fitting from the pin after assembly.

SUMMARY OF THE INVENTION

This invention relates to an improved structure for a fixture for press fitting an end yoke onto the end of a vehicle drive shaft tube which facilitates the easy removal of the end fitting from the pin after assembly. The fixture includes a base having a plurality of tube supports secured thereto for supporting the tube thereon in a predetermined axial orientation. An end fitting is supported on a vertically-oriented, support pin assembly. The support pin assembly includes an upstanding pin having slot formed through the center of the upper end thereof. The slot has a lower edge which extends at an angle relative to the pin. A tab is retained within the slot and guided for sliding movement between a first extended position and a second retracted position. In the extended position, the tab defines a first width for the support pin assembly. In the retracted position, the tab defines a second width for the support pin assembly which is less than the first width. The end yoke is initially supported on the pin by aligning the openings formed through the yoke arms with the pin, then moving the end yoke downwardly such that the pin is received within the aligned yoke arm openings. The openings formed through the yoke arms define an inner diameter which is approximately equal to the first width defined by the support pin assembly when the tab is in the extended position. Thus, the support pin fits snugly within the openings of the yoke arms to insure proper alignment and phasing of the end yoke. At the completion of the press fitting operation, the end yoke is removed from the support pin assembly by raising it upwardly therefrom. When this occurs, the end yoke may be in frictional contact with the support pin assembly. However, the movable tab facilitates the removal of the end yoke from the fixture. When the end yoke is moved upwardly relative to the support pin assembly, the tab will be moved upwardly therewith. As a result, the effective width of the support pin assembly decreases from the first width to the second width. Consequently, any frictional contact between the end yoke and the support pin assembly is eliminated, allowing free removal of the end yoke from the fixture.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
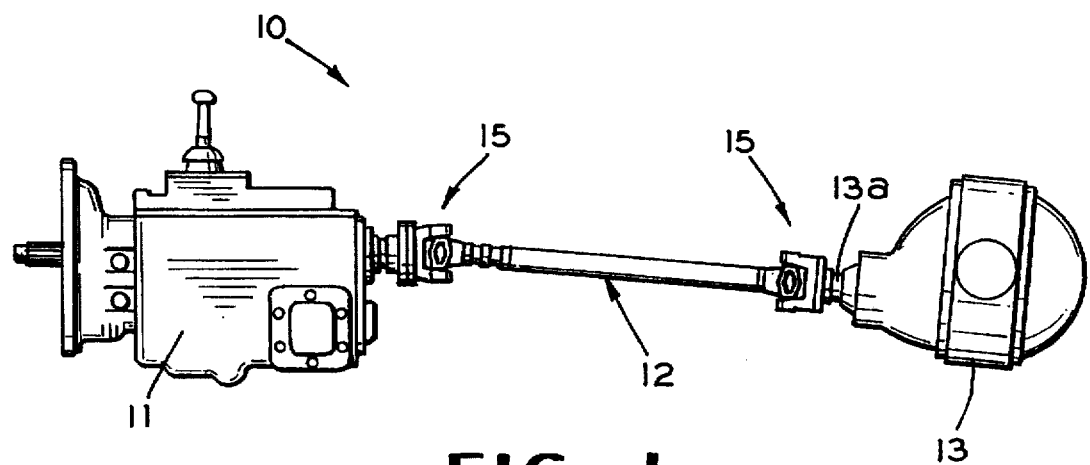
FIG. 1 is a side elevational view of a conventional vehicle drive train system.

Referring now to the drawings, there is illustrated in FIG. 1 a conventional vehicle drive train system, indicated generally at 10. The system 10 includes a transmission 11 which is connected through a drive shaft assembly, indicated generally at 12, to an axle assembly 13. The transmission 11 is rotatably driven by an engine (not shown) which generates rotational power in a conventional manner. As is typical in such a drive train system 10, the output shaft (not shown) of the transmission 11 and the input shaft 13a of the axle assembly 13 are not co-axially aligned. To accommodate this, a universal joint, indicated generally at 15, is provided at each end of the drive shaft assembly 12 to rotatably connect the output shaft of the transmission 11 to the forward end of the drive shaft assembly 12, and further to rotatably connect the rearward end of the drive shaft assembly 12 to the forward end of the axle assembly input shaft 13a.

Figure 2:
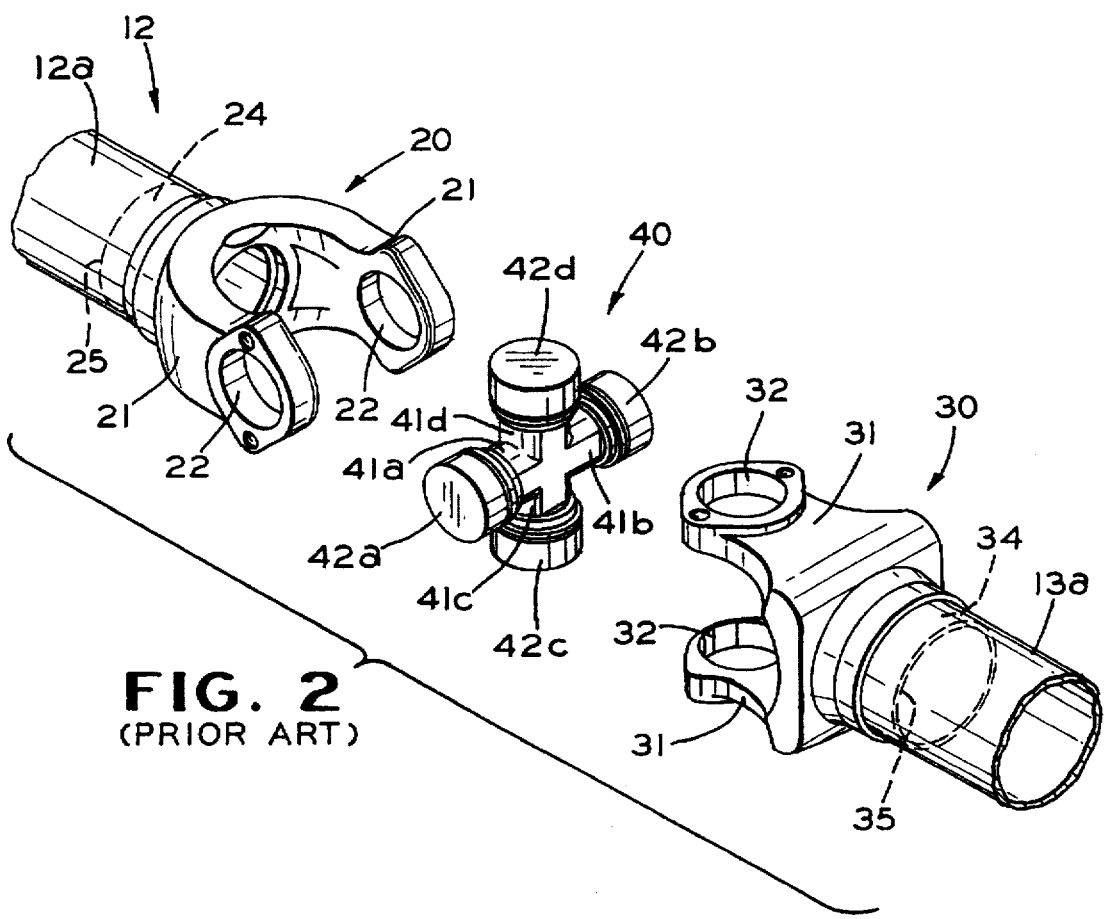
FIG. 2 is an exploded perspective view of a portion of the vehicle drive train system illustrated in FIG. 1.

FIG. 2 more clearly illustrates the rearward portion of the drive train system 10, including the rearward end of the drive shaft assembly 12, the rearward universal joint 15, and the forward end of the axle assembly input shaft 13a. The drive shaft assembly 12 includes a hollow cylindrical tube 12a having a rearward end which is connected to a conventional full round end yoke, indicated generally at 20. The end yoke (also referred to as a tube yoke) includes a pair of opposed yoke arms or lugs 21 which extend in a common plane. A pair of co-axially aligned openings 22 are formed through the yoke arms 21 of the full round end yoke 20. The axis of rotation defined by the openings 22 extends generally perpendicular to the longitudinal axis of the tube 12a. The end yoke 20 also includes a sleeve portion 24 which extends internally within the tube 12a, as indicated by the phantom line 25. The sleeve portion 24 of the end yoke 20 typically engages the tube 12a in a press fit relationship.

As further seen in FIG. 2, the forward end of the axle assembly input shaft 13a is connected to a second conventional full round end yoke, indicated generally at 30. The full round end yoke 30 includes a pair of opposed yoke arms 31 which extend in a common plane and which have a pair of co-axially aligned openings 32 formed therethrough. The axis of rotation defined by the openings 32 extends generally perpendicularly to the longitudinal axis of the axle input shaft 13a. The end yoke 30 also includes a sleeve portion 34 which extends internally within the axle assembly input shaft 13a, as shown by the phantom line 35. The sleeve portion 34 of the end yoke 30 typically engages the input shaft 13a in a press fit relationship.

A conventional universal joint cross, indicated generally at 40, is provided for connecting the end yoke 20 of the drive shaft assembly 12 with the end yoke 30 of the axle assembly input shaft 13a. The cross 40 is formed having four outwardly extending trunnions 41a, 41b, 41c, and 41d. The trunnions 41a, 41b, 41c, and 41d extend in a common plane at right angles to one another. Bearing caps 42a, 42b, 42c, and 42d are respectively mounted on the end of the trunnions 41a, 41b, 41c, and 41d and contains needle bearings (not shown) or other bearing means to allow relative rotation therebetween. A first pair of opposed trunnions 41a and 421b and their associated bearing caps 42a and 42b are received within the openings 22 formed in the yoke arms 21 of the first end yoke 20. A second pair of opposed trunnions 41c and 41d and their associated bearing caps 42c and 42d are received within the openings 32 formed in the yoke arms 31 of the second end yoke 30. A suitable fastening device (not shown) including, but not limited to, snap rings U-bolts, or bolted plates, may be used to secure each pair of opposing trunnions 41 within the yoke arms 21 and 31. As assembled, the universal joint cross 40 transmits rotational movement from the drive shaft 12 to the axle assembly input shaft 13a while allowing the shafts 12 and 13a to extend at an angle relative to one another.

Figure 3:
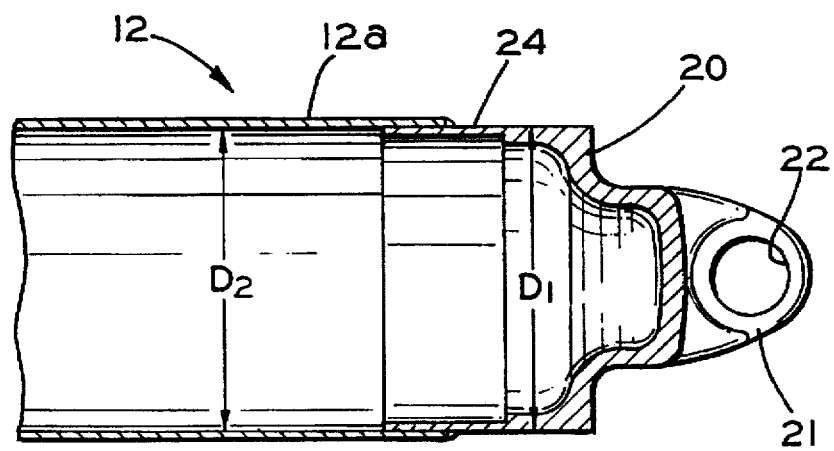
FIG. 3 is a sectional elevational view of one end of a portion of an end yoke and drive shaft assembly for the drive train system illustrated in FIGS. 1 and 2.

FIG. 3 illustrates the rearward end of the drive shaft assembly 12 including the tube 12a having the end yoke 20 press fit therein. The sleeve portion 24 of the end yoke 20 has an outer diameter D 1 which is approximately equal to the inner diameter D2 of the drive shaft 12. Because these two diameters D1 and D2 are approximately the same, a relatively large force must be exerted against the tube 12a and the end yoke 20 to insert the sleeve portion 24 inside the drive shaft 12.

Figure 4:
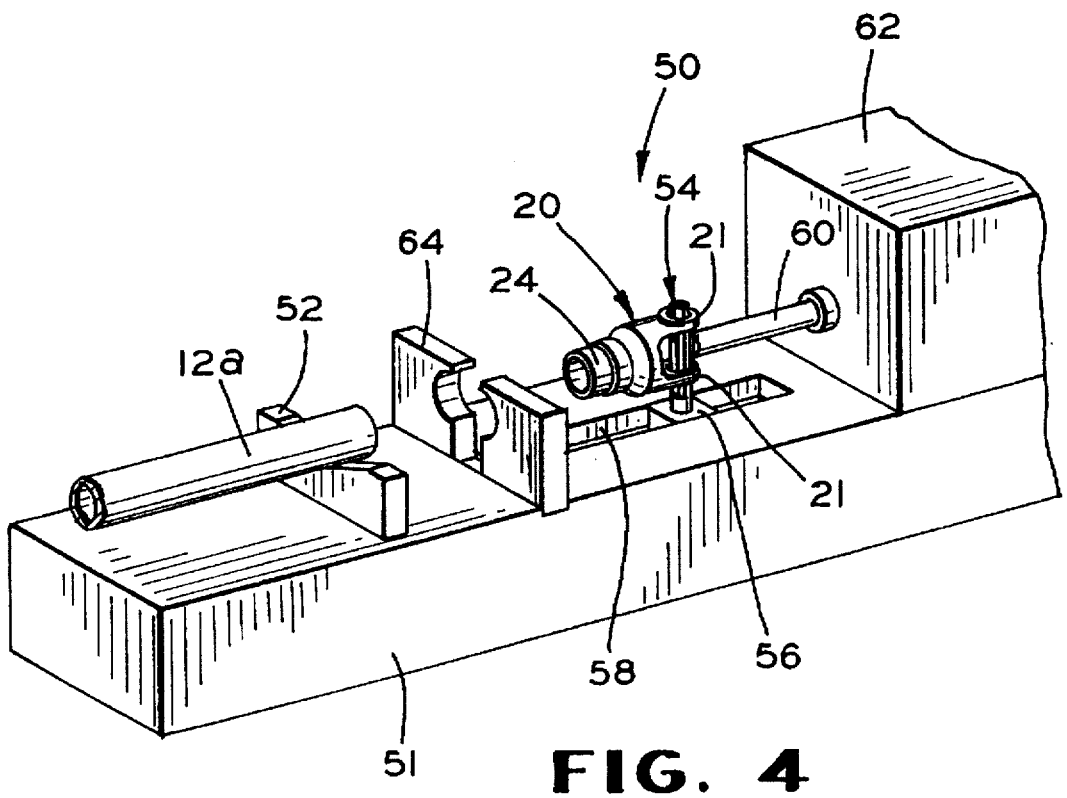
FIG. 4 is a schematic perspective view of a portion of a fixture in accordance with this invention for press fitting an end fitting onto an end of a drive shaft tube.

FIG. 4 illustrates a schematic view of a portion of a fixture, indicated generally at 50, which may be used for press fitting the end yoke 20 onto the end of the tube 12a. The fixture 50 is generally conventional in the art and includes a base 51 having at least one (and preferably two or more) tube supports 52 secured thereto. The tube supports 52 are provided for supporting the tube 12a thereon in a predetermined axial orientation. An end fitting, such as the end yoke 20, is supported on a vertically oriented, support pin assembly, indicated generally at 54, in accordance with this invention. To accomplish this, the support pin assembly 54 extends through the aligned openings 22 formed through the arms 21 of the end yoke 20. The end yoke 20 is positioned on the support pin assembly 54 such that the sleeve portion 24 of the end yoke 20 extends co-axial with the end of the tube 12a. The support pin assembly 54 may be secured to a base 56 which is axially slidable within a horizontal track 58 provided in the base 51 of the fixture 50. An axially movable ram 60 or similar device may be used to move the support pin assembly 54 and end yoke 20 toward the open end of the tube 12a. The ram 60 may be operated by any suitable actuator 62, such as a hydraulic or electric actuator. An end fitting support 64 may be used to align and guide the end fitting 20 onto the end of the tube 12a.

Figure 5:
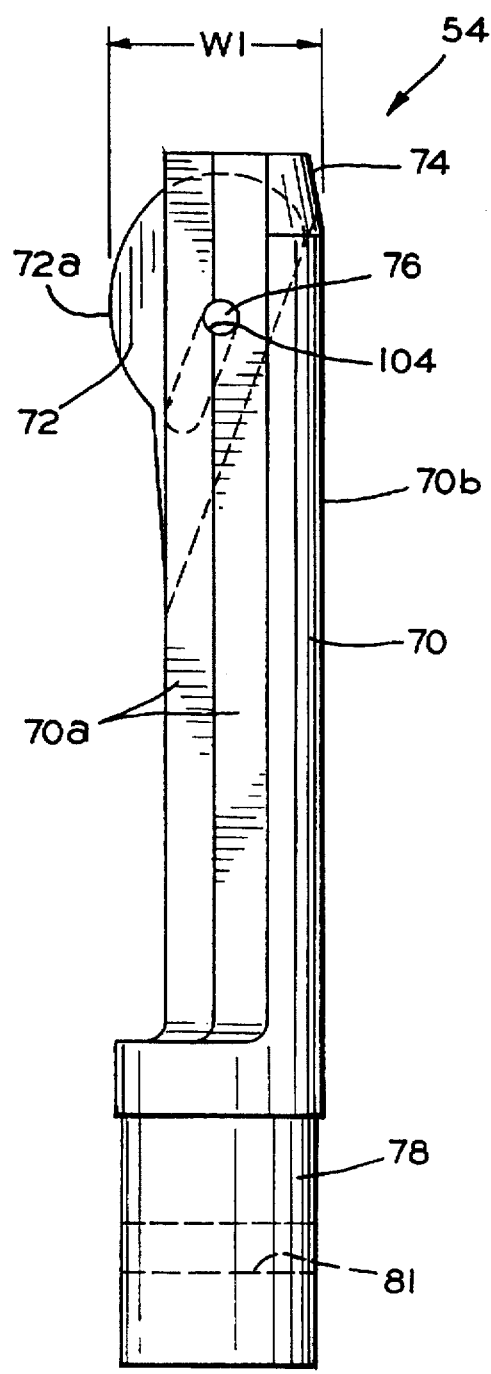
FIG. 5 is an enlarged side elevational view of an end fitting support pin assembly used in the fixture illustrated in FIG. 4, wherein a movable tab is shown in a first position relative to the support pin.
Figure 6:
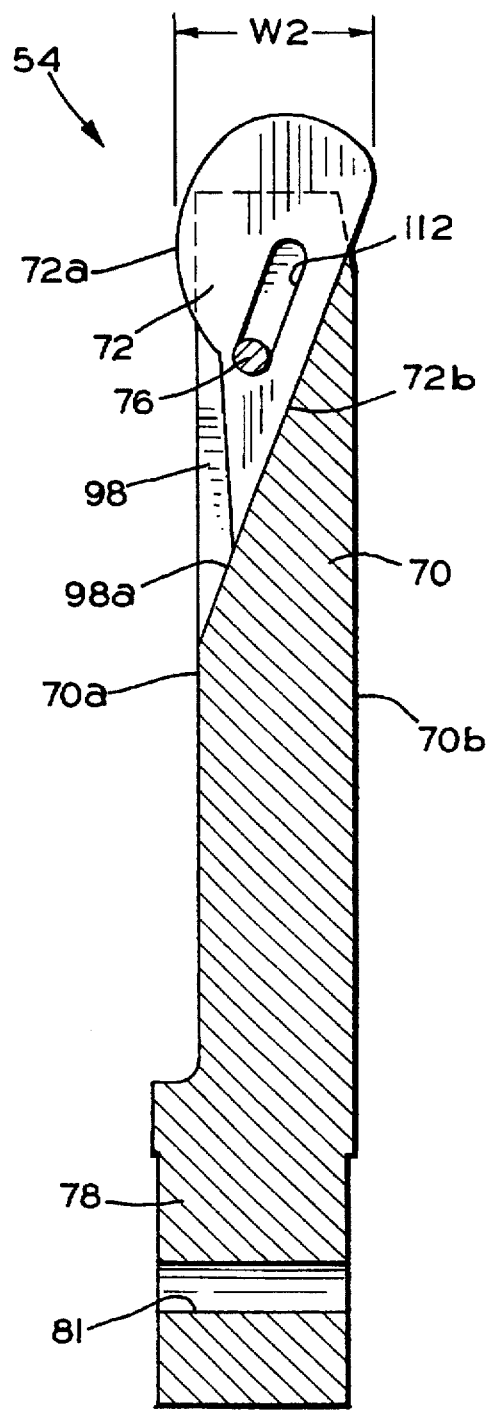
FIG. 6 is a sectional side elevational view of the end fitting support pin assembly illustrated in FIG. 5, wherein the tab is shown in a second position relative to the support pin.

The structure of the support pin assembly 54 is illustrated in detail in FIGS. 5 through 8. As shown therein, the support pin assembly 54 includes an upstanding pin 70. The illustrated pin 70 is generally cylindrical in shape and extends upwardly from a base portion 78. The base portion 78 is generally circular in cross section shape and has a transverse aperture 81 formed therethrough to facilitate connection to the fixture 50. The main body of the pin 70 has a plurality of generally flat surfaces 70a formed on one side thereof and a round surface 70b formed on the opposite surface thereof. For example, the main body of the pin 70 may be formed having five flat faces 70a formed on one semi-circular half thereof and the round surface 70b extending throughout the remaining semi-circular half thereof. The upper end of the pin 70 may terminate in a slight taper, as shown at 74 in FIG. 5. The purpose of the taper 74 will be explained below. A narrow slot 98 is formed through the center of the upper end of the main body of the pin 70. As best shown in FIG. 6, the slot 98 has a lower edge 98a which extends at an angle relative to the pin 70, preferably about 20° relative thereto.

A tab 72 is disposed within the slot 98. The tab 72 is a generally flat member having a width which is slightly smaller than the width of the slot 98. Thus, the tab 72 is guided for sliding movement within the slot 98. The tab 72 has a rounded upper surface 72a and a flat lower surface 72b. The purpose for the rounded upper surface 72a will be explained below. The flat lower surface 72b preferably extends at an angle which is complementary to the lower surface 98a of the slot 98. Thus, the tab 72 is guided for sliding movement along the lower surface 98a of the slot 98. A tab slot 112 is formed through the tab 72. As best shown in FIG. 6, the tab slot 112 preferably extends at the same angle as the lower surface 72b of the tab 72. A transverse pin 76 extends through a pair of openings 104 (only one is illustrated in FIG. 5 and the tab slot 112 to retain the tab 72 within the slot 98 formed in the pin 70. To accomplish this, the ends of the transverse pin 76 are press fit or otherwise secured within the openings 104 formed through the pin 70.

Thus, it can be seen that the tab 72 is retained within the slot 98 formed in the pin 70 for sliding movement between a first extended position (illustrated in FIG. 5) and a second retracted position (illustrated in FIG. 6). In the extended position illustrated in FIG. 5, the tab 72 defines a first width W1 for the support pin assembly 54. In the retracted position illustrated in FIG. 6, the tab 72 defines a second width W2 for the support pin assembly 54. As is apparent from the drawings, the second width W2 is less than the first width W1 for a purpose which will be explained below.

Figure 7:
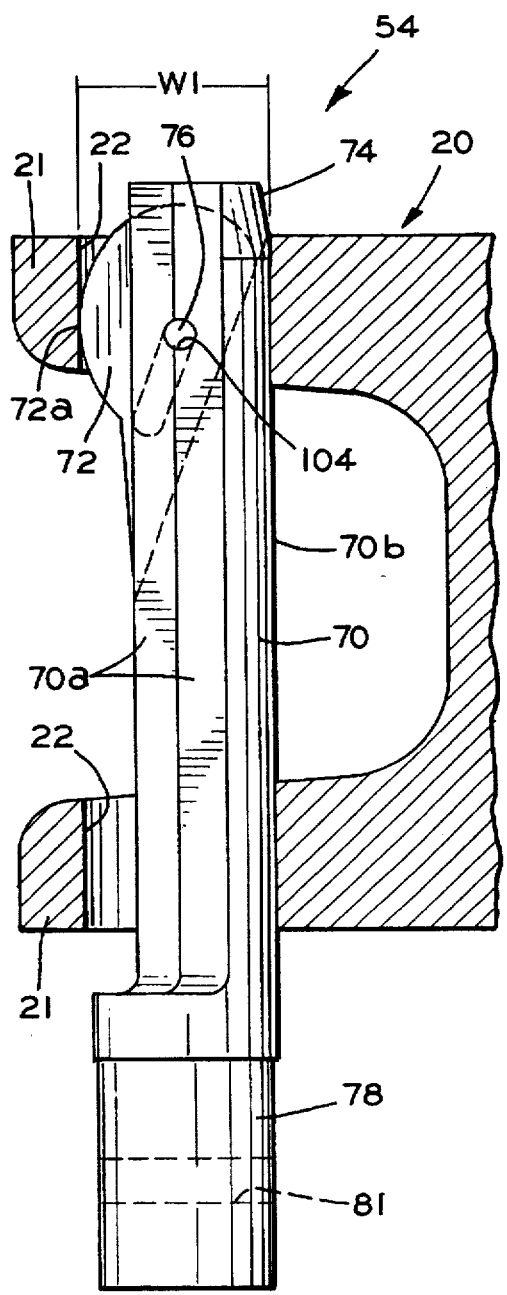
FIG. 7 is a sectional side elevational view of the end fitting support pin illustrated in FIG. 4 having an end yoke mounted thereto prior to installation on a tube for the drive shaft assembly.
Figure 8:
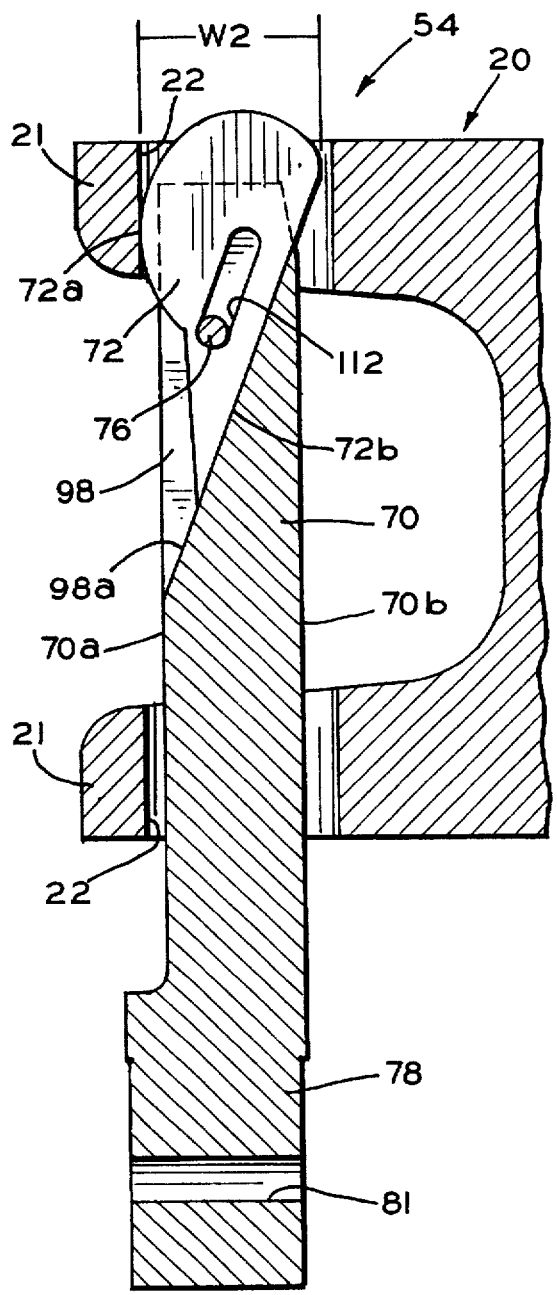
FIG. 8 is a sectional side elevational view of the end fitting support pin illustrated in FIG. 7 showing the end yoke as it is being removed from therefrom after installation on the tube.

Referring now to FIGS. 7 and 8, the operation of the support pin assembly 54 and fixture 50 will be explained. As shown in FIG. 7, the tab 72 is normally maintained in the extended position illustrated in FIG. 7 under the influence of gravity. The end yoke 20 is initially supported on the pin 70 by aligning the openings 22 formed through the yoke arms 21 with the pin 70, then moving the end yoke 20 downwardly such that the pin 70 is received within the aligned yoke arm openings 22. The openings 22 formed through the yoke arms 21 define an inner diameter which is approximately equal to the first width W1 defined by the support pin assembly 54 when the tab 72 is in the extended position illustrated in FIG. 7. Thus, the support pin 70 fits snugly within the openings 22 of the yoke arms 21 to insure proper alignment and phasing of the end yoke 20. At the same time, a tube 12a is positioned on the tube supports 52 on the fixture 50. Then, the actuator 62 is energized to cause the 60 to move the support pin assembly 54 and end yoke 20 toward the open end of the tube 12a. As a result, the sleeve portion 24 of the end yoke 20 is press fit within the hollow end of the tube 12a. The pin 70 provides a reaction surface to support the end yoke 20 in position during this press-fitting operation.

At the completion of the press fitting operation, the end yoke 20 is removed from the support pin assembly 54 by raising it upwardly therefrom. When this occurs, the end yoke 20 may be in frictional contact with the support pin assembly 54, as described above. However, the movable tab 72 facilitates the removal of the end yoke 20 from the fixture 50. When the end yoke 20 is moved upwardly relative to the support pin assembly 54, the tab 72 will be moved upwardly therewith, as shown in FIG. 8. As a result, the effective width of the support pin assembly 54 decreases from the first width W1 to the second width W2. Consequently, any frictional contact between the end yoke 20 and the support pin assembly 54 is eliminated, allowing free removal of the end yoke 20 from the fixture 50.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of mounting an end fitting onto an end of a hollow tube comprising the steps of:
    (a) providing a support pin assembly including a pin having a slot formed therein and a tab within said slot for sliding movement between a first position, wherein a first width is defined for said support pin assembly, and a second position, wherein a second width is defined for said support pin assembly, said second width being less than said first width;
    (b) providing an end fitting having an opening formed therethrough defining an inner surface having a width that is approximately equal to said first width of the support pin assembly;
    (c) supporting the end fitting on the support pin assembly by inserting the pin through the opening and providing the tab in said first position such that the support pin assembly engages the inner surface of the end fitting;
    (d) mounting the end fitting on the tube; and
    (e) moving the end fitting and tube relative to the support pin assembly such that said tab is moved toward the second position to facilitate removal of the end fitting and tube from the support pin assembly.

2. The method according to claim 1 wherein said step (d) is performed by press fitting the end fitting within the hollow tube.

3. The method according to claim 1 wherein said step (e) is performed by moving the tube and end fitting so as to slide said tab toward said second position.

4. The method according to claim 1 wherein said tab includes a generally round portion defined by a round surface and a straight surface, said tab engaging the inner surface of the end fitting opening with said round surface.

5. The method according to claim 1 wherein said pin has a predetermined width, and wherein said slot formed in said pin extends across said predetermined width at an angle relative to a length of said pin so as to define an angled surface on said pin.

6. The method according to claim 5 wherein said tab includes a generally round portion defined by a round surface and a straight surface, said straight surface of said tab engaging said angled surface on said pin when said tab is moved relative to said pin.

7. The method according to claim 1 wherein said tab includes a generally oval-shaped aperture formed therein, and wherein said pin includes an aperture formed therein which extends transversely to said slot, said tab being slidably secured to said pin by a fastener which extends through said tab aperture and said pin aperture when said apertures are aligned.

8. The method according to claim 1 wherein said pin includes a top end and a base, said top end having a reduced width in comparison to said base.

9. The method according to claim 8 wherein said base of said pin is adapted to cooperate with a machine used for mounting the end fitting onto the hollow tube.

10. The method according to claim 1 wherein said pin has a perimeter which is defined by at least one flat surface and a round surface, said pin having a predetermined width that is measured between said flat surface and said round surface.

11. The method according to claim 10 wherein said perimeter of said pin is defined by first, second, third, fourth and fifth flat surfaces and said round surface, said predetermined width being measured between said third flat surface and said round surface.

* * * * *